April 19, 1938.　　　J. BURT　　　2,114,911

ANTIFRICTION BEARING CENTER FOR BORING MILLS

Filed July 13, 1935

Inventor:—
John Burt
by his Attorneys
Howson & Howson

Patented Apr. 19, 1938

2,114,911

UNITED STATES PATENT OFFICE 2,114,911

ANTIFRICTION BEARING CENTER FOR BORING MILLS

John Burt, Narberth, Pa., assignor to William Sellers & Company, Incorporated, Philadelphia, Pa., a corporation of Pennsylvania Application July 13, 1935, Serial No. 31,277

10 Claims. (Cl. 308—230)

This invention relates to improvements in boring mills and contemplates an improved form of center bearing for the rotary table.

Heretofore it has been customary to provide extended sleeve bearings comprising a long central spindle depending from the table, a sleeve on the bed embracing the spindle, and a bushing between the sleeve and the spindle and forming the bearing proper. For clearance adjustment, the bushing was tapered, requiring that either the sleeve of the bed or the spindle be provided with a corresponding taper.

A principal object of the present invention is to provide a bearing center that as regards the conventional center described above shall be characterized by a relatively high functional efficiency, relative simplicity of form, assembly and adjustment, and relative inexpensiveness of manufacture and maintenance; all as hereinafter more specifically set forth.

The invention resides in the mechanical arrangements and details hereinafter described and illustrated in the attached drawing, in which.

Figure 1:
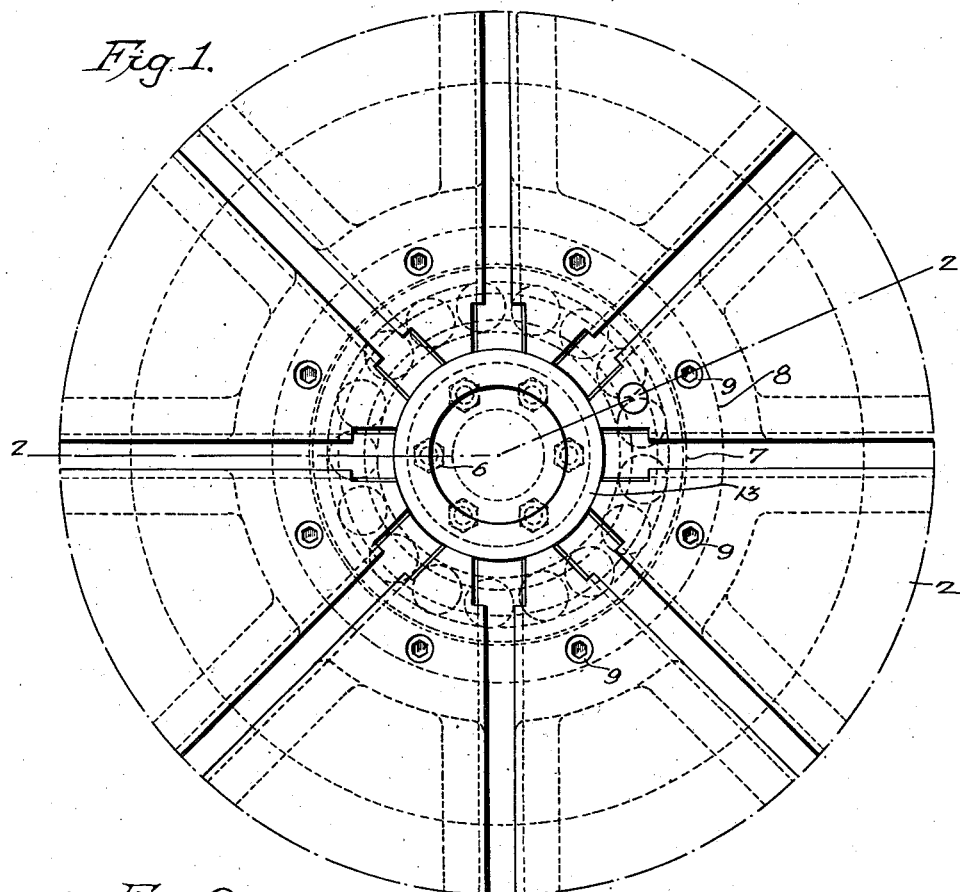
Fig. 1 is a plan view of the central portion of a boring mill table.
Figure 2:
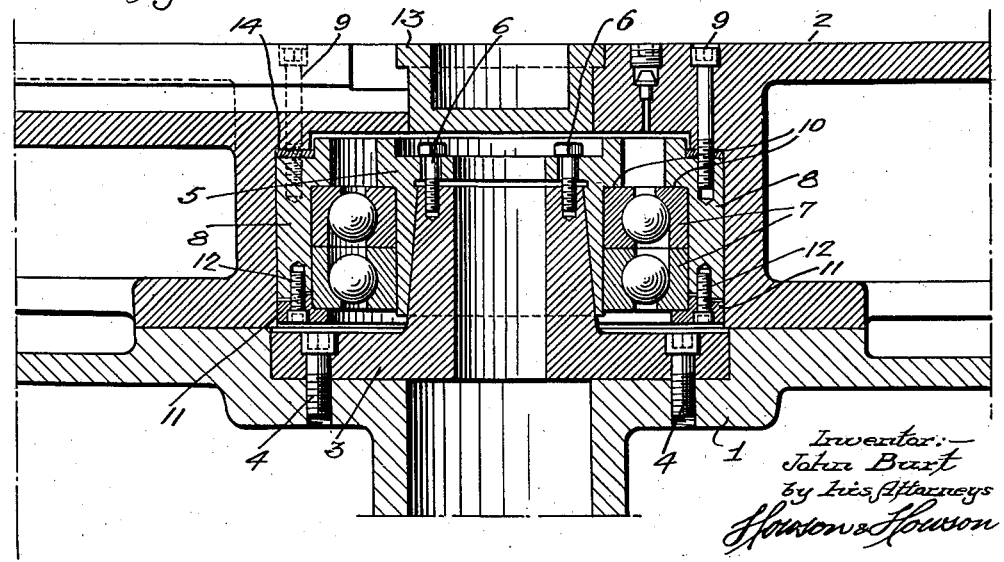
Fig. 2 is a section on the line 2—2 of Fig. 1.

With reference to the drawing, 1 is the bed and 2 the rotary table of the mill. 3 is a tapered pintle secured to the bed by bolts 4 and supporting a correspondingly tapered sleeve element 5 which is secured to the pintle by bolts 6 and constitutes an inner annular support for antifriction bearings 7. A ring 8 secured to the table 2 by bolts 9 forms an outer support for the bearings 7, and both the ring 8 and sleeve 5 are undercut at 10, 10 to form an annular recess in which the bearings are lodged and in which they are retained by a flanged ring 11 attached by bolts 12 to the bottom of the ring 8.

In assembling the machine the bearing structure including the elements 5, 7, 8 and 11 may be loosely secured by the bolts 9 in the table, and the latter then placed in position upon the bed with the sleeve element 5 engaging the pintle 3. The bolts 6 are then tightened to thereby locate and fix the bearing center and the table coaxially with the pintle. Access to the bolts 6 through the top of the table is afforded by the removable plug 13. The bolts 9 are not tightened until the bolts 6 have been adjusted, and so that the bolts 9 may be tightened down solidly after the proper adjustment is found, it is preferred to employ a permanent filler brace between the ring 8 and the under side of the table 2, as indicated at 14. In removing the table from the bed at any subsequent time, it is necessary only to remove the plug 13 and to disengage the bolts 6, thereby permitting the table including the bearing structure to be lifted from the pintle and the bed. In again placing the table on the machine, no further adjustment of the bolts 9 and ring 11 is required unless the bearings are renewed.

In this construction, it is proposed that the bearings 7, which in the illustrated embodiment of the invention are of the ball type, shall be preloaded so that when the ring 11 is clamped home the bearings will carry the predetermined load without end play. This factor in the construction described above insures elimination of lost motion between the bed and the table in the plane of the latter which insures extreme accuracy in the normal operation of the machine and in this respect constitutes a material improvement over the conventional type of bearing center wherein it is necessary to allow sufficient clearance for oil film. This allowance of a small amount of float in the conventional bearing center makes it difficult to turn work round within .002" or closer. Furthermore with the conventional bearing construction where accuracy is required, it is necessary to adjust the bearing for any substantial change in speed, since high-speed operation requires so much clearance that the work may be as much as .004" to .005" out when turning at slow speeds with the same amount of clearance. With the bearing construction forming the subject of the present invention, no adjustment of this character is required as the lost motion has been eliminated and the bearings have a capacity for speeds far in excess of the practicably obtainable table speeds. A further substantial advantage of my construction over the conventional one briefly described above resides in the fact that no pit is required under the machine. Nearly all machines of the conventional bearing center construction require a pit of sufficient size to afford access for adjustment of the spindle bearings, since all such machines require periodic adjustment and there is no way of adjusting from the top of the table. Elimination of the pit saves considerable expense in the foundation, particularly where the machine is mounted on low ground where it is difficult to adequately drain the pit and to prevent the seeping in of water. My construction effects a further substantial economy by reason of the materially simplified construction and elimination of the long expensive spindle and tapered bushing and sleeve construction required in the conventional bearing center.

A still further advantage over the conventional bearing construction resides in the feature of simplified lubrication. Anti-friction bearings may be adequately lubricated by packing in grease and require only periodic attention at relatively long intervals. With the conventional construction, particularly for relatively close fits, it is necessary to have a continual flow of oil through the bearing, this oil either draining into the pit, which is wasteful and inconvenient, or being collected and returned by means of a pump to a tank where it requires filtering before further use. The above advantages of my construction combined with the relative simplicity and ease of assembly and of removing and replacing the table constitute a material improvement over the prior art relating to bearing centers of this class.

It will be understood that there may be modification of the illustrated construction without departure from the invention, which is not limited for example to the specific type of anti-friction bearing disclosed in the drawing.

I claim:

1. An anti-friction bearing center for rotary-table machine tools, said bearing center comprising in combination a relatively fixed pintle, a sleeve element detachably secured to said pintle, a second annular element embracing said sleeve and detachably secured at the under side of the table, and anti-friction bearings confined between said elements, and means for effecting self-centering of said sleeve upon the pintle.

2. An anti-friction bearing center for rotary-table machine tools, said bearing center comprising in combination a relatively fixed pintle, an anti-friction bearing structure operatively associated with said pintle and table and comprising radially spaced elements constructed to form therebetween an undercut recess for reception of said bearings, means for securing the inner of said elements to the pintle, means for securing the bearings in the other of said elements, and means for securing and axially adjusting the last-named of said elements in the table.

3. An anti-friction bearing center for rotary-table machine tools, said bearing center comprising in combination a relatively fixed pintle, an anti-friction bearing structure operatively associated with said pintle and table and comprising radially spaced elements having in their respective adjoining faces undercut shoulders jointly defining the top of an annular bearing-receiving chamber, antifriction bearings closely confined in said chamber and secured in the outer of said elements, and means for securing said inner and outer elements respectively to the pintle and the table, the securing means for the outer element providing for axial adjustment of the bearings on the table.

4. An anti-friction bearing center for rotary-table machine tools, said bearing center comprising in combination a relatively fixed pintle, an element detachably secured to said pintle and forming a stop for locating the bearings axially of the pintle, a bearing-supporting element secured to the table for adjustment axially of the pintle, and antifriction bearings carried by said supporting element and seating upon said stop element.

5. An anti-friction bearing center for rotary-table machine tools, said bearing center comprising a relatively fixed pintle, and a bearing structure removable as a unit with the table and comprising a pintle-engaging element having an undercut seat for the bearings, a carrier for said bearings, means for securing said pintle-engaging element to the pintle, and means for securing said bearing carrier to the table for adjustment axially of the pintle and into engagement with the seat on said pintle-engaging element.

6. In a rotary-table machine tool, the combination with a bed, of a table mounted on said bed, and means for securing said table for rotation about a fixed vertical axis, said means comprising a member on the bed having a vertically aligned conical seating surface, a second member having a complementary conical surface adapted to seat against the conical surface of the first-named member and assemblable with the latter member from above, an anti-friction bearing embracing said second member and confined radially between said member and the table and maintaining said table coaxial with respect to said members, and means for supporting said bearing and the said second member on the table to form with the latter a unit for assembly, as such, with the bed, whereby said complementary conical surfaces may function to guide the table into the true axial position on the bed.

7. In a rotary-table machine tool, the combination with a bed, of a table mounted on said bed, and means for securing said table for rotation about a fixed vertical axis, said means comprising a member on the bed having a vertically aligned conical seating surface, a second member having a complementary conical surface adapted to seat against the conical surface of the first-named member and assemblable with the latter member from above, an anti-friction bearing embracing said second member and confined radially between said member and the table and maintaining said table coaxial with respect to said members, and means for preloading the bearing between the table and said second member, said bearing and second member being supported on the table and forming with the latter a unit for assembly, as such, with the bed, whereby said complementary conical surfaces may function to guide the table into the true axial position on the bed.

8. In a rotary-table machine tool, the combination with a bed, of a table mounted on said bed, and means for securing said table for rotation about a fixed vertical axis, said means comprising a member on the bed having a vertically aligned conical seating surface, and anti-friction bearing means located centrally of the table and including an inner member having a complementary conical surface adapted to seat against the conical surface of the first-named member and assemblable with the latter member from above, said bearing means being secured to the table to form with the latter a unit for assembly, as such, with the bed, and said complementary conical surfaces constituting a means for guiding the table into the true axial position on the bed, and means for radially expanding said bearing to place the latter under load and to thereby fix the axis of rotation of the table on the bed.

9. In a rotary-table machine tool, the combination with a bed, of a table mounted on said bed, and means for securing said table for rotation about a fixed vertical axis, said means comprising a vertically disposed upwardly tapered conical pintle on the bed, a sleeve having a complementary inner conical surface adapted to seat on said pintle, an antifriction bearing embracing said sleeve and confined radially between the sleeve and the table, means for securing said sleeve to the pintle, and other means for placing said bearing under radial load between the table and the sleeve to thereby fix the axis of rotation of the table on the bed.

10. In a rotary-table machine tool, the combination with a bed, of a table mounted on said bed, and means for securing said table for rotation about a fixed vertical axis, said means comprising a member on the bed having a vertically aligned conical seating surface, a second member having a complementary conical surface adapted to seat against the conical surface of the first-named member and assemblable with the latter member from above, an anti-friction bearing embracing said second member and confined radially between said member and the table and maintaining said table coaxial with respect to said members, means for securing said members together, and separate means for placing said bearing under radial load between said second member and the table to thereby fix the axis of rotation of the table on the bed.

JOHN BURT.